US012510859B2

(12) United States Patent
Kimura et al.

(10) Patent No.: US 12,510,859 B2
(45) Date of Patent: Dec. 30, 2025

(54) IMAGE FORMING APPARATUS AND COATING-FILM ADJUSTING METHOD

(71) Applicants: Hideki Kimura, Kanagawa (JP); Seiichi Kogure, Kanagawa (JP); Hiroshi Kikuchi, Kanagawa (JP); Hirotaka Hatta, Kanagawa (JP); Yusuke Ishizuka, Kanagawa (JP); Takuya Akiyama, Kanagawa (JP); Yuuki Aoki, Tokyo (JP); Yutaka Goto, Tokyo (JP); Masashi Tachi, Kanagawa (JP)

(72) Inventors: Hideki Kimura, Kanagawa (JP); Seiichi Kogure, Kanagawa (JP); Hiroshi Kikuchi, Kanagawa (JP); Hirotaka Hatta, Kanagawa (JP); Yusuke Ishizuka, Kanagawa (JP); Takuya Akiyama, Kanagawa (JP); Yuuki Aoki, Tokyo (JP); Yutaka Goto, Tokyo (JP); Masashi Tachi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/665,918

(22) Filed: May 16, 2024

(65) Prior Publication Data

US 2024/0393728 A1 Nov. 28, 2024

(30) Foreign Application Priority Data

May 26, 2023 (JP) ................................ 2023-087177
Mar. 25, 2024 (JP) ................................ 2024-048260

(51) Int. Cl.
*G03G 21/00* (2006.01)

(52) U.S. Cl.
CPC . *G03G 21/0017* (2013.01); *G03G 2221/0005* (2013.01)

(58) Field of Classification Search
CPC ....... G03G 21/0017; G03G 2221/0005; G03G 21/0011; G03G 21/0094
See application file for complete search history.

(56) References Cited

U.S. PATENT DOCUMENTS 7,826,786 B2 * 11/2010 Suda ................. G03G 21/0011 399/346
2009/0185842 A1 * 7/2009 Hatori ............... G03G 21/0011 399/346
(Continued)

FOREIGN PATENT DOCUMENTS

JP H06348193 A 12/1994
JP H07306616 A 11/1995
(Continued)

*Primary Examiner* — Sandra Brase
(74) *Attorney, Agent, or Firm* — Harness, Dickey & Pierce, P.L.C.

(57) ABSTRACT

An image forming apparatus includes an image bearer, a cleaning blade having an elastic member contacting a surface of the image bearer, the cleaning blade removing a residue on the surface of the image bearer, and a controller. In the image forming apparatus, the cleaning blade has a coating film of a lubricant formed on an edge contacting, at least, the image bearer, and the controller performs an initial coating film adjustment before an image is initially formed. In the image forming apparatus, the initial coating film adjustment includes driving the image bearer to rotate, sliding the image bearer and the cleaning blade, removing a portion of the coating film of the lubricant, which is formed on the cleaning blade, and exposing the edge of the cleaning blade.

6 Claims, 7 Drawing Sheets

(56) References Cited

U.S. PATENT DOCUMENTS

| | | | | |
|---|---|---|---|---|
| 2010/0215417 | A1* | 8/2010 | Fujimori | G03G 21/0011<br>399/346 |
| 2013/0045029 | A1 | 2/2013 | Kimura et al. | |
| 2014/0376970 | A1 | 12/2014 | Kimura et al. | |
| 2015/0037050 | A1 | 2/2015 | Kimura et al. | |
| 2016/0170329 | A1 | 6/2016 | Kimura et al. | |
| 2018/0046128 | A1* | 2/2018 | Tomita | G03G 21/0011 |
| 2019/0258199 | A1 | 8/2019 | Kimura | |
| 2020/0233365 | A1 | 7/2020 | Kimura et al. | |
| 2020/0387085 | A1 | 12/2020 | Ishizuka et al. | |
| 2021/0033998 | A1 | 2/2021 | Kikuchi et al. | |
| 2021/0200120 | A1 | 7/2021 | Takami et al. | |
| 2022/0107579 | A1 | 4/2022 | Ishizuka et al. | |
| 2022/0317601 | A1 | 10/2022 | Aoki et al. | |
| 2023/0061068 | A1 | 3/2023 | Goto et al. | |
| 2023/0103454 | A1 | 4/2023 | Kikuchi et al. | |
| 2023/0384730 | A1 | 11/2023 | Shimada et al. | |

FOREIGN PATENT DOCUMENTS

| | | | |
|---|---|---|---|
| JP | H08220962 | A | 8/1996 |
| JP | H10214009 | A | 8/1998 |
| JP | 2000147972 | A | 5/2000 |
| JP | 2004101551 | A | 4/2004 |

* cited by examiner

IMAGE FORMING APPARATUS AND COATING-FILM ADJUSTING METHOD

CROSS-REFERENCE TO RELATED APPLICATIONS

This patent application is based on and claims priority pursuant to 35 U.S.C. § 119 (a) to Japanese Patent Application Nos. 2023-087177 and 2024-048260, filed on May 26, 2023, and Mar. 25, 2024, respectively, in the Japan Patent Office, the entire disclosures of which are hereby incorporated by reference herein.

BACKGROUND

Technical Field

The present disclosure relates to an image forming apparatus and a coating-film adjusting method.

Background Art

In image forming apparatuses that adopt electrophotography, it is known in the art that a cleaning blade is used for a cleaning device that cleans an image bearer. The cleaning blade contacts the image bearer to remove the residues on the image bearer.

The cleaning blade that adopts a supporting member and an elastic member such as a polyurethane rubber is widely used and the elastic member contacts the image bearer.

For example, a lubricant that contains fluoride is known in the art, and vinylidene fluoride is used for some of the fluoride. According to the related art, lubricant dispersant in which fluoric inert liquid is dispersed is applied to a portion of the cleaning blade pressed against the image bearer.

SUMMARY

The present disclosure described herein provides an image forming apparatus including an image bearer, a cleaning blade having an elastic member contacting a surface of the image bearer, the cleaning blade removing a residue on the surface of the image bearer, and a controller. In the image forming apparatus, the cleaning blade has a coating film of a lubricant formed on an edge contacting, at least, the image bearer, and the controller performs an initial coating film adjustment before an image is initially formed. In the image forming apparatus, the initial coating film adjustment includes driving the image bearer to rotate, sliding the image bearer and the cleaning blade, removing a portion of the coating film of the lubricant, which is formed on the cleaning blade, and exposing the edge of the cleaning blade.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

Figure 1:
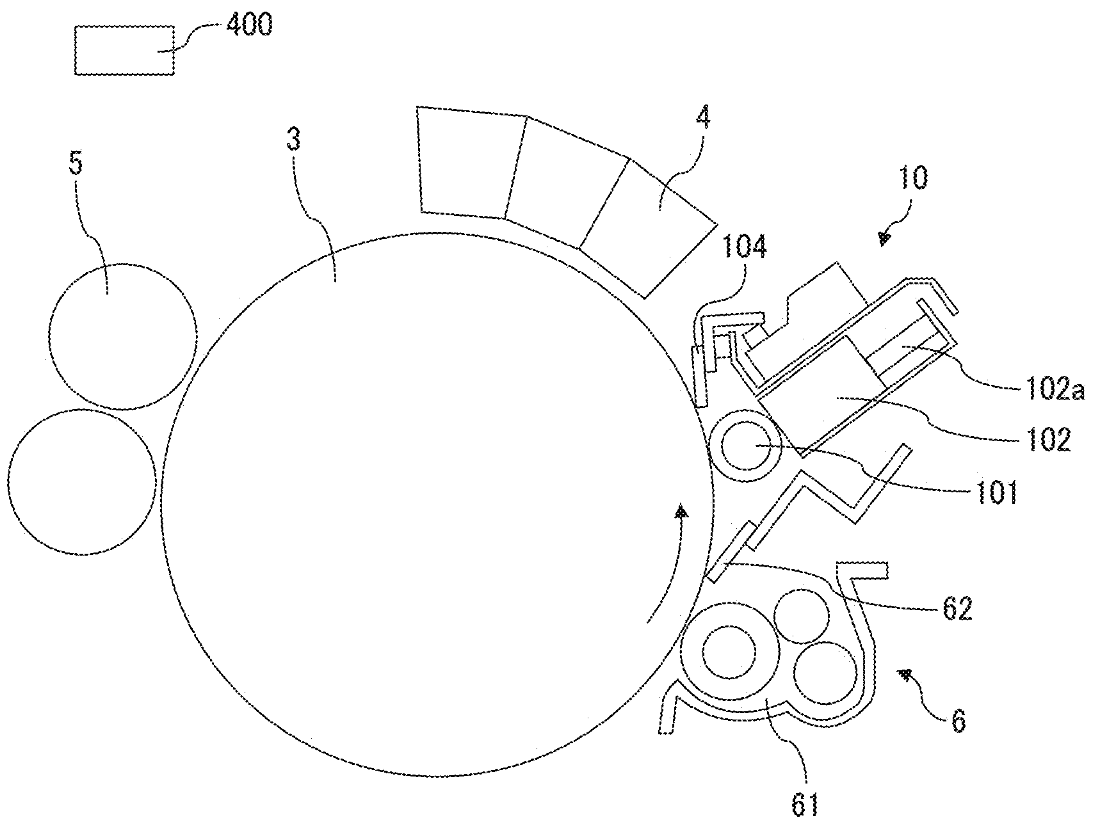
FIG. 1 is a schematic diagram of an image forming apparatus.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to limit the present disclosure. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

An image forming apparatus and a method of adjusting a coating film according to embodiments of the present disclosure are described below with reference to the drawings.

The image forming apparatus according to the present embodiment includes an image bearer, a cleaning blade having an elastic member contacting a surface of the image bearer, and a controller. The cleaning blade removes a residue on the surface of the image bearer. The cleaning blade has a coating film of a lubricant formed on an edge contacting, at least, the image bearer, and the controller performs an initial coating film adjustment before an image is initially formed. The initial coating film adjustment includes driving the image bearer to rotate, sliding the image bearer and the cleaning blade, removing a portion of the coating film of the lubricant, which is formed on the cleaning blade, and exposing the edge of the cleaning blade.

The method of adjusting the coating film is a method of adjusting the coating film on a cleaning blade in an image forming apparatus, and the image forming apparatus includes an image bearer and a cleaning blade having an elastic member contacting a surface of the image bearer. The cleaning blade removes a residue on the surface of the image bearer. The method includes initially adjusting the coating film before an image is initially formed, and forming a coating film of a lubricant on an edge of the cleaning blade before the initially adjusting the coating film. The edge of the cleaning blade contacts, at least, the image bearer. The initially adjusting the coating film includes driving the image bearer to rotate, sliding the image bearer and the cleaning blade, removing a portion of the coating film of the lubricant, which is formed on the cleaning blade, and exposing the edge of the cleaning blade.

FIG. 1 is a schematic diagram of an image forming apparatus.

The image forming apparatus is provided with a photoconductor 3 that is shaped like a drum and is an example of a latent-image bearer. The image bearer may be referred to as, for example, a photoconductor or an electrostatic latent image bearer. In addition to the photoconductor 3 that is shaped like a drum, the image bearer may be a sheet-like object or an endless belt.

Around the photoconductor 3, for example, a charging device 4, a developing device 5, a cleaning device 6, and a lubricant applicator 10 are arranged. Furthermore, an electric-charge removing unit provided with, for example, an electric-charge removing lamp, as well as a transfer device provided with, for example, a transfer roller, may be arranged around the photoconductor 3.

The charger 4 has a current-carrying part that electrically charges the photoconductor 3. The developing device 5 supplies toner to the photoconductor 3 to develop a toner image of the latent image formed on the surface of the photoconductor 3. Such a latent image may be referred to as, for example, an electrostatic latent image. The toner image on the photoconductor 3 is transferred by a transfer device to an intermediate transferor such as an intermediate transfer belt. The toner image on the photoconductor 3 may be transferred to a recording medium.

The cleaning device 6 cleans the photoconductor 3 on which a toner image has been transferred. The cleaning device 6 includes the cleaning blade 62. The cleaning blade 62 has an elastic member that contacts the surface of the photoconductor 3 to remove the residues on the surface of the photoconductor 3. The residues include, for example, transfer residual toner. In the present embodiment, the cleaning blade 62 contacts the photoconductor 3 in the counter direction with reference to the direction in which the surface of the photoconductor 3 moves. The cleaned toner is collected in a toner collecting unit 61.

The lubricant applicator 10 is a lubricant applicator that applies lubricant on the surface of the photoconductor 3 after the cleaning device 6 has done cleaning. The lubricant applicator 10 includes, for example, a lubricant application rotor 101 and an application blade 104.

For example, an applying brush or an applying roller can be used as the lubricant application rotor 101, and it is desired that an applying brush be used. The lubricant application rotor 101 rotates in the corotating direction with reference to the direction in which the photoconductor 3 rotates, and applies a lubricant 102 to the photoconductor 3 while rotating. The lubricant that has been applied to the photoconductor 3 is leveled off by the application blade 104 to adjust the thickness of the lubricant. The application blade 104 may be referred to as, for example, a smoother blade.

For example, the lubricant 102 is kept in a bracket, and is pressed against the lubricant application rotor 101 by a biasing member 102*a* such as a lubricant pressing spring. For example, the biasing member may be controlled to control whether or not to apply the lubricant 102 to the photoconductor 3.

The image forming apparatus according to the present embodiment includes a controller 400. The controller 400 controls a plurality of devices or means when an image is formed. Moreover, the controller 400 controls a plurality of devices or means when initial coating film adjustment or a step of initially adjusting the coating film is performed.

Figure 2:
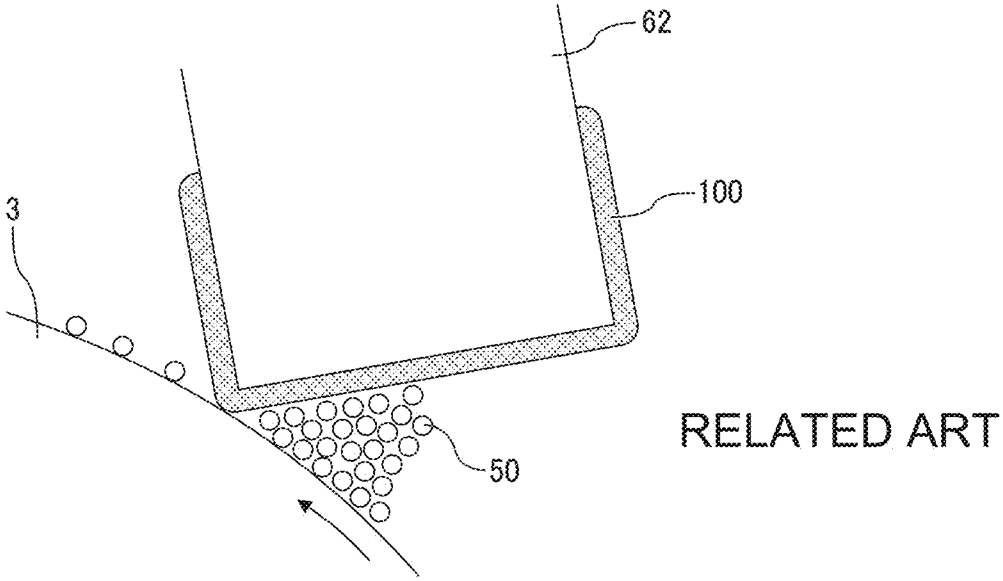
FIG. 2 is a schematic diagram of a contact portion of the cleaning blade of FIG. 1 during an image-forming operation according to the related art.
Figure 3:
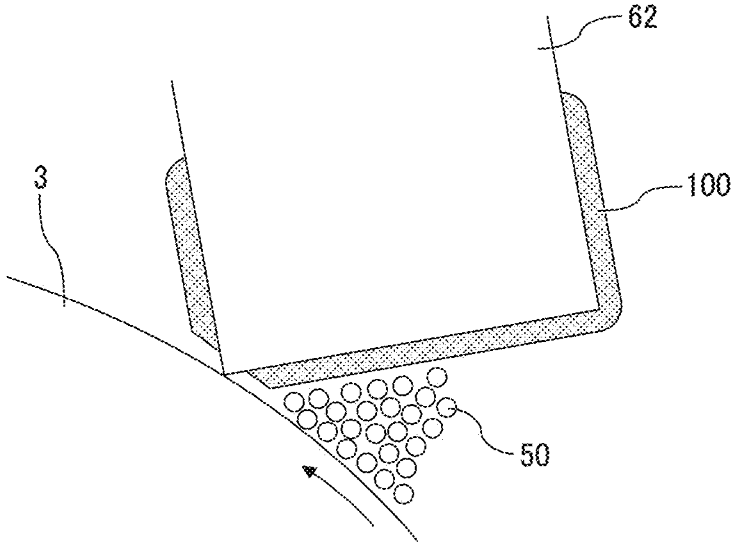
RELATED ART FIG. 3
FIG. 3 is another schematic diagram of a contact portion of the cleaning blade of FIG. 1 during an image-forming operation.

FIG. 2 and FIG. 3 are schematic diagrams each of which illustrates a contact portion of the cleaning blade 62 during an image-forming operation. FIG. 2 and FIG. 3 are diagrams each of which illustrates how the cleaning blade 62 scrapes the toner 50 remaining on the photoconductor 3.

In the related art, the coating film 100 of the lubricant is formed so as to cover the edge of cleaning blade 62, and under these conditions, images are formed and the image bearer is cleaned. Under such conditions, a portion of the cleaning blade 62 that contacts the photoconductor 3 is rounded due to the thickness of the coating film 100 of the lubricant, and the radius of curvature increases in an undesired manner. As the radius of curvature of a portion of the cleaning blade 62 that contacts the photoconductor 3 is wide, the cleaning tends to end in failure. In other words, the toner slips off easily and the residual toner cannot sufficiently be removed. In particular, when an image having a large image-area ratio is output, the amount of transfer residual toner increases, and the cleaning tends to end in failure.

By contrast, in the present embodiment, the initial coating film adjustment is performed before an image is initially formed, and a portion of the coating film 100 of the lubricant, which is formed on the cleaning blade 62, is removed to expose an edge of the cleaning blade 62. According to such a configuration, the cleaning blade 62 contacts the photoconductor 3 at its edge, and the cleaning performance can be enhanced. Moreover, the chances of failure in cleaning can be reduced.

The edge of the cleaning blade 62 may be referred to as, for example, a front end. The initial coating film adjustment may be referred to simply as, for example, coating film adjustment in the following description. The step of initially adjusting the coating film may be referred to simply as, for example, a step of adjusting the coating film in the following description. The initial coating film adjustment is implemented as the controller 400 controls a plurality of devices or units. The step of initially adjusting the coating film is performed in a similar manner to the initial coating film adjustment.

In the initial coating film adjustment, the photoconductor 3 is driven to rotate, and the photoconductor 3 and the cleaning blade 62 are slid. Due to such a configuration as described above, a portion of the coating film 100 of the lubricant, which is formed on the cleaning blade 62, is scraped or removed, and an edge of the cleaning blade 62 can be exposed.

For example, a touch-up is performed to form the coating film of a lubricant on the cleaning blade before an image is initially formed. In the touch-up, for example, a lubricant is applied to the cleaning blade 62 when the image forming apparatus is assembled. Alternatively, for example, the touch-up may be performed when the cleaning blade is replaced, when the cleaning device 6 is replaced, or when the lubricant applicator 10 is replaced. By performing the touch-up, for example, the cleaning blade can be prevented from being damaged.

The expression "before an image is initially formed" indicates, for example, the timing before the first image is formed when the image forming apparatus is initially assembled, when the image bearer 3 is replaced, when the cleaning device 6 is replaced, or when the cleaning blade 62 is replaced. The timing before an image is initially formed may be referred to as, for example, an initial stage of usage.

For example, the initial coating film adjustment may be a method in which the photoconductor 3 is driven to rotate and the coating film 100 of the lubricant that covers the edge of the cleaning blade 62 is scraped or removed. The direction in which the image bearer 3 is driven to rotate in the initial coating film adjustment may be the same direction as that when an image is formed, or may be reversed to the direction when an image is formed. Preferably, the direction in which the image bearer 3 is driven to rotate in the initial coating film adjustment is reversed to the direction when an image is formed.

Figure 4:
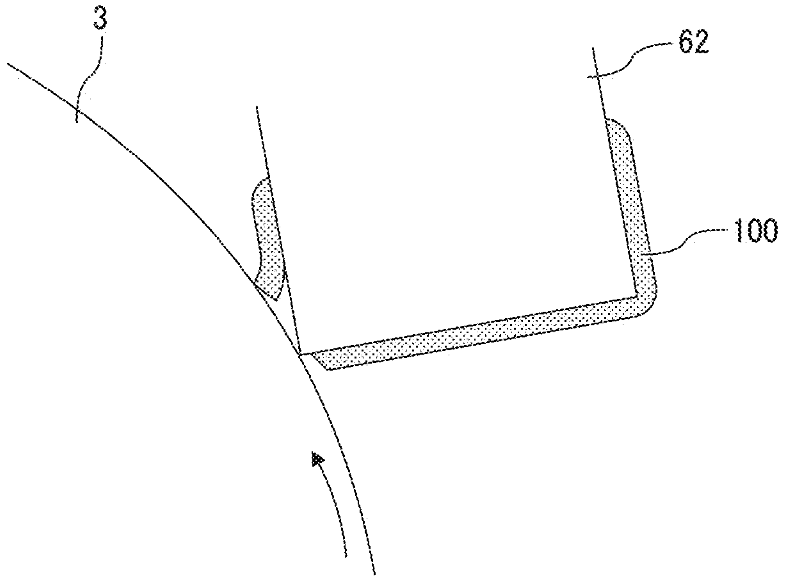
FIG. 4 is a schematic diagram illustrating the initial coating film adjustment in which the photoconductor of FIG. 1 is driven to rotate in the same direction as that during the image-forming operation.

FIG. 4 is a schematic diagram illustrating the initial coating film adjustment in which the photoconductor 3 is driven to rotate in the same direction as that during the image-forming operation.

Rotating the photoconductor 3 in the same direction as that when an image is formed may be referred to as, for example, the rotation in the normal direction or the rotation in the forward direction.

Figure 5:
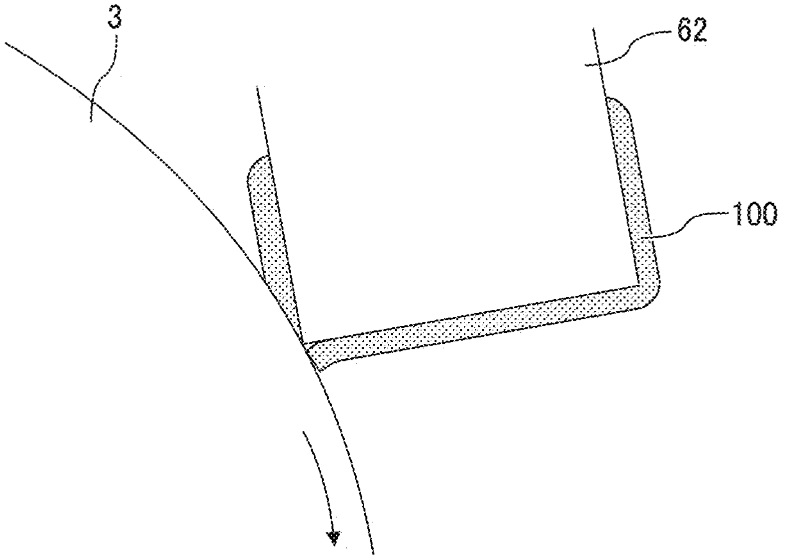
FIG. 5 is a schematic diagram illustrating the initial coating film adjustment in which the photoconductor of FIG. 1 is driven to rotate in the reverse direction to that during the image-forming operation.

FIG. 5 is a schematic diagram illustrating the initial coating film adjustment in which the photoconductor 3 is driven to rotate in the reverse direction to that during the image-forming operation.

Rotating the photoconductor 3 in the direction reversed to when an image is formed may be referred to as, for example, the rotation in the reverse direction or the rotation in the inverse direction.

When the photoconductor 3 is rotated in the normal direction in the initial coating film adjustment as illustrated in FIG. 4, the coating film 100 of the lubricant that covers the edge of the cleaning blade 62 can be scraped or removed as appropriate However, the coating film 100 of the lubricant tends to float up. As illustrated in FIG. 4, at a portion of the coating film 100 of the lubricant downstream from the edge of the cleaning blade 62 floats up from the cleaning blade 62. As described above, when a portion of the coating film 100 of the lubricant floats up from the cleaning blade 62, there are some cases in which a gap appears and the toner gets into that gap.

When the photoconductor 3 is rotated in the normal direction in the initial coating film adjustment, there are some cases in which the coating film 100 of the lubricant that covers the edge of the cleaning blade 62 rises in an unintentional manner. When a portion of the coating film 100 of the lubricant rises, the contact between the edge of the cleaning blade 62 and the photoconductor 3 may become unstable.

On the other hand, when the photoconductor 3 is rotated in the normal direction in the initial coating film adjustment, it is satisfactory as long as the photoconductor 3 is driven to rotate in the same direction as that during the image-forming operation. In such a configuration, control can be made easily.

As illustrated in FIG. 5, when the photoconductor 3 is rotated in the reversed manner in the initial coating film adjustment, the coating film 100 of the lubricant that covers the edge of the cleaning blade 62 can be scraped or removed as appropriate. When the photoconductor 3 is driven to rotate in the reversed manner as illustrated in FIG. 5, the coating film 100 of the lubricant can be scraped or removed with high stability compared with when the photoconductor 3 is rotated in the normal direction as illustrated in FIG. 4.

When the photoconductor 3 is rotated in the reversed manner in the initial coating film adjustment, the coating film 100 of the lubricant deforms in line with the shape of the photoconductor 3. For this reason, when the photoconductor 3 is rotated in the reversed manner, the coating film 100 of the lubricant does not peel off easily compared with when the photoconductor 3 is rotated in the normal direction, and is less likely to float up from the cleaning blade 62. As the coating film 100 of the lubricant is less likely to float up from the cleaning blade 62, it is less likely that a gap will appear, and the toner can be prevented from getting into that gap. As the photoconductor 3 rotates in the normal direction during the image-forming operation, it is less likely that the toner gets into the gap, and the coating film 100 of the lubricant does not easily rise.

In the initial coating film adjustment, any desired length of time for which the photoconductor 3 is rotated may be determined, and it is desired that such a length of time be equal to or longer than thirty seconds and equal to or shorter than ten minutes. According to the study, appropriate length of time for which the photoconductor 3 is rotated in the initial coating film adjustment varies depending on, for example, the state of the photoconductor 3, such as whether the photoconductor is new, the usage of the photoconductor 3, such as the amount of filler, and the use environment.

By adopting the above range, the coating film 100 of the lubricant that covers the edge of the cleaning blade 62 can be scraped or removed as appropriate. By setting the length of time to thirty seconds or more, the coating film 100 of the lubricant can sufficiently be scraped or removed, and the chances of failure in cleaning can be reduced. By setting the length of time to ten minutes or less, a user is not kept waiting in an inappropriate or unnecessary manner.

The image forming apparatus according to the present embodiment includes the lubricant applicator 10 that applies the lubricant to the photoconductor 3. The lubricant applicator 10 is an example of a lubricant applicator. In the initial coating film adjustment, the controller 400 can control whether or not to apply the lubricant using the lubricant applicator. As the lubricant is applied using the lubricant applicator 10 in the initial coating film adjustment, the cleaning blade can be prevented from curling up in the initial coating film adjustment. As whether or not to apply the lubricant using the lubricant applicator 10 is controlled in the initial coating film adjustment, an excessive application of the lubricant can be prevented, and the coating film of the lubricant on the edge of the cleaning blade can efficiently be scraped or removed.

It is desired that some of (1) to (3) given below is performed in the initial coating film adjustment.

(1) Start applying a lubricant with the lubricant applicator as the image bearer starts rotating, apply a lubricant while the image bearer is being driven to rotate (2) Start applying a lubricant by the lubricant applicator before driving the image bearer to rotate (3) Apply a lubricant by the lubricant applicator only for a specific length of time of the period of time for which the image bearer is driven to rotate Before an image is initially formed, a lubricant is applied to the cleaning blade. However, no lubricant has been applied to the photoconductor 3. For this reason, when the initial coating film adjustment is performed under these conditions, there are some cases in which the cleaning blade curls up. By performing any one of (1) to (3), the cleaning blade can be prevented from curling up when the initial coating film adjustment is performed. When (1) to (3) are performed, in the initial coating film adjustment, the coating film of the lubricant on the edge of the cleaning blade is scraped together with the application of a lubricant to the image bearer.

Figure 6:
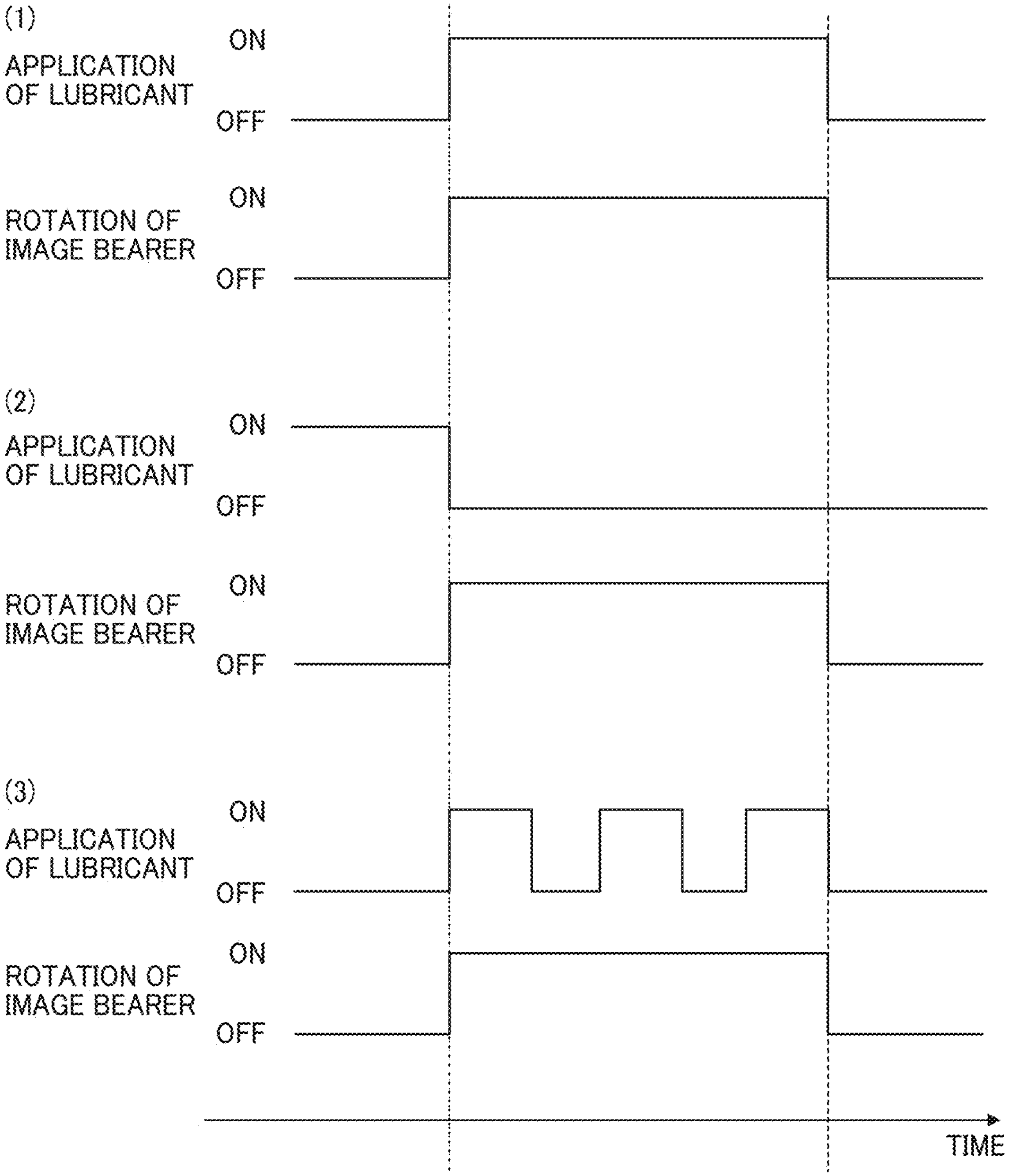
FIG. 6 is a diagram illustrating the first to third example operations in an initial coating film adjustment.

FIG. 6 is a diagram illustrating the above operations (1) to (3) in the initial coating film adjustment.

In (1), the application of the lubricant is started as the image bearer that is the photoconductor 3 starts rotating, and a lubricant is applied while the image bearer is being driven to rotate. The length of time for which the image bearer is driven to rotate is equal to or approximately equal to the length of time for which a lubricant is applied to the image bearer.

No limitation is intended, but turning on and off of the application of a lubricant is performed as follows. As a biasing member such as a lubricant pressing spring presses the lubricant 102 against the lubricant application rotor 101, a lubricant can be applied to the photoconductor 3. By controlling the biasing member not to press the lubricant, the application of the lubricant can be stopped. Such control of the biasing member is implemented by the controller 400.

In (2), the application of the lubricant is started before the image bearer is driven to rotate. If the lubricant is applied to the image bearer excessively, there are some cases in which the coating film of the lubricant that is applied to the cleaning blade cannot easily be scraped due to its lubricity. In view of these circumstances, in order not to apply the lubricant to an excessive degree, the lubricant application rotor 101 is driven to rotate in advance to apply the lubricant, and the application of the lubricant is terminated at the time when the image bearer starts rotating or before or after that time.

In the operations described with reference to FIG. 6, the timing when the application of the lubricant is terminated (OFF) coincides with the timing when the image bearer starts rotating (ON). However, (2) is not limited to such a configuration, and the timing when the application of the lubricant is terminated (OFF) may be made earlier than or later than the timing when the image bearer starts rotating (ON).

When (2) is performed, a driver that drives the lubricant application rotor 101 to rotate is used. Due to such a configuration, even when the image bearer is not rotating, the lubricant application rotor 101 can be driven to rotate to apply the lubricant.

In (3), the lubricant is applied only for a specific length of time of the period of time for which the image bearer is driven to rotate. Such a specific length of time may be determined as desired, and the application of the lubricant and its termination (ON and OFF) may be repeated as illustrated in FIG. 6. In order not to apply the lubricant to an excessive degree, it is desired that the application of the lubricant be terminated after the rotation of the image bearer is turned off (OFF).

In the case of (1), the lubricant application rotor 101 rotates together with the rotation of the photoconductor 3 in the initial coating film adjustment, and the lubricant is applied to the photoconductor 3. Accordingly, curling up of the cleaning blade can easily be prevented. In the case of (2), in the initial coating film adjustment, the lubricant is applied to the photoconductor 3 before the photoconductor 3 starts rotating. Accordingly, when the cleaning blade is likely to curl up, the photoconductor 3 can be driven to rotate with the lubricant applied. In the initial coating film adjustment, an excessive application of the lubricant can be prevented. Accordingly, the coating film 100 at the edge can be efficiently scraped or removed while preventing the curling up of the cleaning blade. In the case of (3), the application of the lubricant in the initial coating film adjustment can be minimized, and thus the coating film 100 at the edge can be efficiently scraped or removed.

The cleaning blade 62 has an elastic member that contacts the surface of the image bearer. For example, the elastic member is supported by a supporting member, and is used as a rectangular elastic blade. The elastic member is not limited to any particular member, and any desired member may be adopted depending on the intended purpose. The elastic member may be made of, for example, polyurethane rubber, silicone rubber, fluoric rubber, nitrile-c rubber (NBR), ethylene-propylene diene rubber, and ethylene-propylene terpolymer (EPDM). Among these materials, it is desired that polyurethane rubber be used with a view to durability or avoiding contamination. The polyurethane rubber has a high ratio of repulsive elasticity, and is more likely to follow, for example, the eccentricity of the photoconductor 3 or minute waviness on the surface of the photoconductor 3.

The lubricant is not limited to any particular substance, and any desired substance may be selected. A lubricant including, for example, metallic soap such as zinc stearate, polymethyl methacrylate (PMMA) particles, or fluoride may be used. Examples of the fluoride include vinylidene fluoride.

Figure 7:
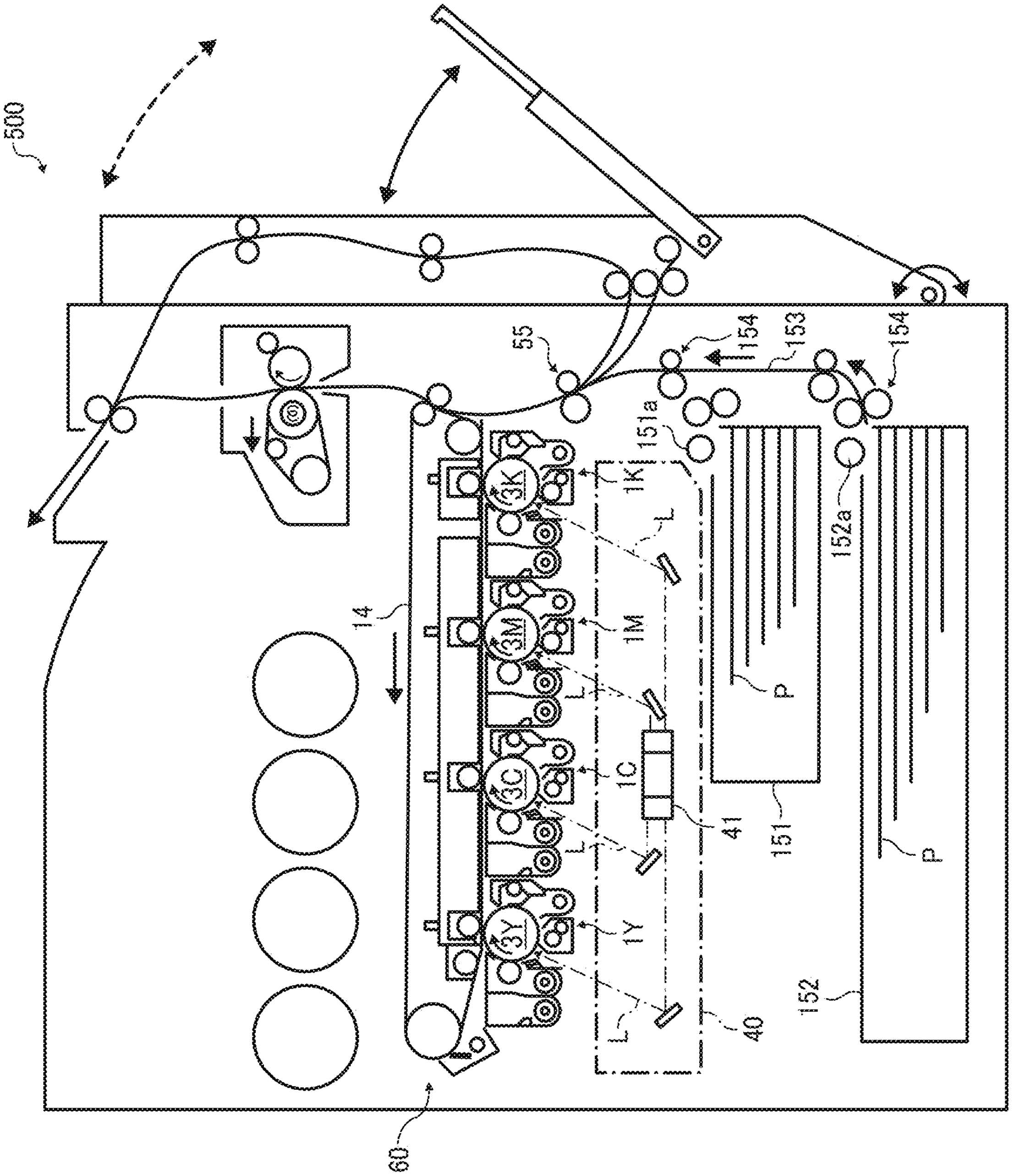
FIG. 7 is another schematic diagram of an image forming apparatus.

FIG. 7 is another schematic diagram of an image forming apparatus 500.

The image forming apparatus 500 is provided with four image forming units 1Y, 1M, 1C, and 1K that are used to form yellow (Y), magenta (M), cyan (C), and black (K) images, respectively. As substances used to form an image, these image forming units 1Y, 1M, 1C, and 1K use yellow (Y), magenta (M), cyan (C), and black (K) toner of colors different from each other. In the other aspects, those four image forming units 1Y, 1M, 1C, and 1K have a similar structure or configuration to each other. Each of the image forming units 1Y, 1M, 1C, and 1K may have a similar configuration or structure to that of the image forming unit 1 described above with reference to FIG. 1.

Above the four image forming units 1, the transfer unit 60 provided with the intermediate transfer belt 14 that is an example of an intermediate transferor is arranged. The toner images of different colors that are formed on the surfaces of the photoconductors 3Y, 3M, 3C, and 3K provided for the image forming units 1Y, 1M, 1C, and 1K are transferred onto the surface of the intermediate transfer belt 14 upon being superimposed on top of one another.

An optical writing unit 40 is arranged below the four image forming units 1. The optical writing unit 40 that is an example of a latent-image forming unit irradiates the photoconductors 3Y, 3M, 3C, and 3K provided for the image forming units 1Y, 1M, 1C, and 1K with the laser beams L emitted based on the image data. Accordingly, electrostatic latent images for yellow (Y), magenta (M), cyan (C), and black (K) color toner are formed on the photoconductors 3Y, 3M, 3C, and 3K.

The optical writing unit 40 irradiates the photoconductors 3Y, 3M, 3C, and 3K with the laser beams L through a plurality of optical lenses and mirrors while deflecting the laser beams L emitted from a light source by a polygon mirror 41 that is driven to rotate by a motor. Instead of such a configuration or structure as described above, a configuration in which optical scanning is performed using an array of light-emitting diodes (LEDs) may be adopted.

A first sheet tray 151 and a second sheet tray 152 are arranged under the optical writing unit 40 so as to overlap each other in the vertical direction. A plurality of recording media P are stacked and stored in the first sheet tray 151 and the second sheet tray 152 in a state of a sheet bundle, and a first sheet feed roller 151*a* and a second sheet feed roller

152*a* contact the uppermost one of the recording media P in the first sheet tray 151 and the second sheet tray 152, respectively.

When the first sheet feed roller 151*a* is driven by a driver to rotate in a counterclockwise direction in FIG. 7, the uppermost one of the recording media P in the first sheet tray 151 is ejected to a sheet conveyance path 153 that is arranged so as to extend in the vertical direction on the right side of the first sheet tray 151 and the second sheet tray 152 in FIG. 7. When the second sheet feed roller 152*a* is driven by a driver to rotate in a counterclockwise direction in FIG. 7, the uppermost one of the recording media P in the second sheet tray 152 is ejected to the sheet conveyance path 153.

Along the sheet conveyance path 153, a plurality of conveyance roller pairs 154 are arranged. The recording media P that are fed to the sheet conveyance path 153 are conveyed from a lower portion to an upper portion of the sheet conveyance path 153 in FIG. 7 while being nipped at the roller nips of these conveyance roller pairs 154.

A registration roller pair 55 is arranged at a downstream end of the sheet conveyance path 153 in the conveyance direction. The registration roller pair 55 terminates the rotation of both rollers on a temporary basis immediately after the recording medium P conveyed from the conveyance roller pair 154 is nipped between a pair of rollers. Then, in a timely manner, the registration roller pair 55 sends out the recording medium P toward a secondary transfer nip as will be described later in detail.

Figure 8:
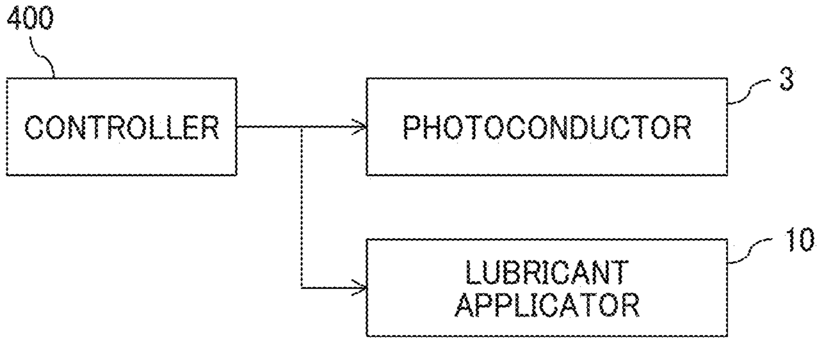
FIG. 8 is a diagram illustrating the control blocks of an initial coating film adjustment.

FIG. 8 is a diagram illustrating the control blocks of an initial coating film adjustment.

The controller 400 includes a central processing unit (CPU) that serves as a computation unit and a storage unit such as a random-access memory (RAM) or a read-only memory (ROM). The CPU of the controller 400 executes various kinds of computation or control based on the control program stored in the ROM.

In the initial coating film adjustment, the controller 400 controls, for example, the rotation of the photoconductor 3 and turning on and off of the application of lubricant. The controller 400 controls, for example, the start and termination of the rotation of the photoconductor 3, the direction of the rotation of the photoconductor 3, whether or not to drive the biasing member to press the lubricant 102 in the lubricant applicator 10, and the rotation of the lubricant application rotor 101, based on a control program. The initial coating film adjustment can be implemented by those kinds of control by the controller 400.

Figure 9:
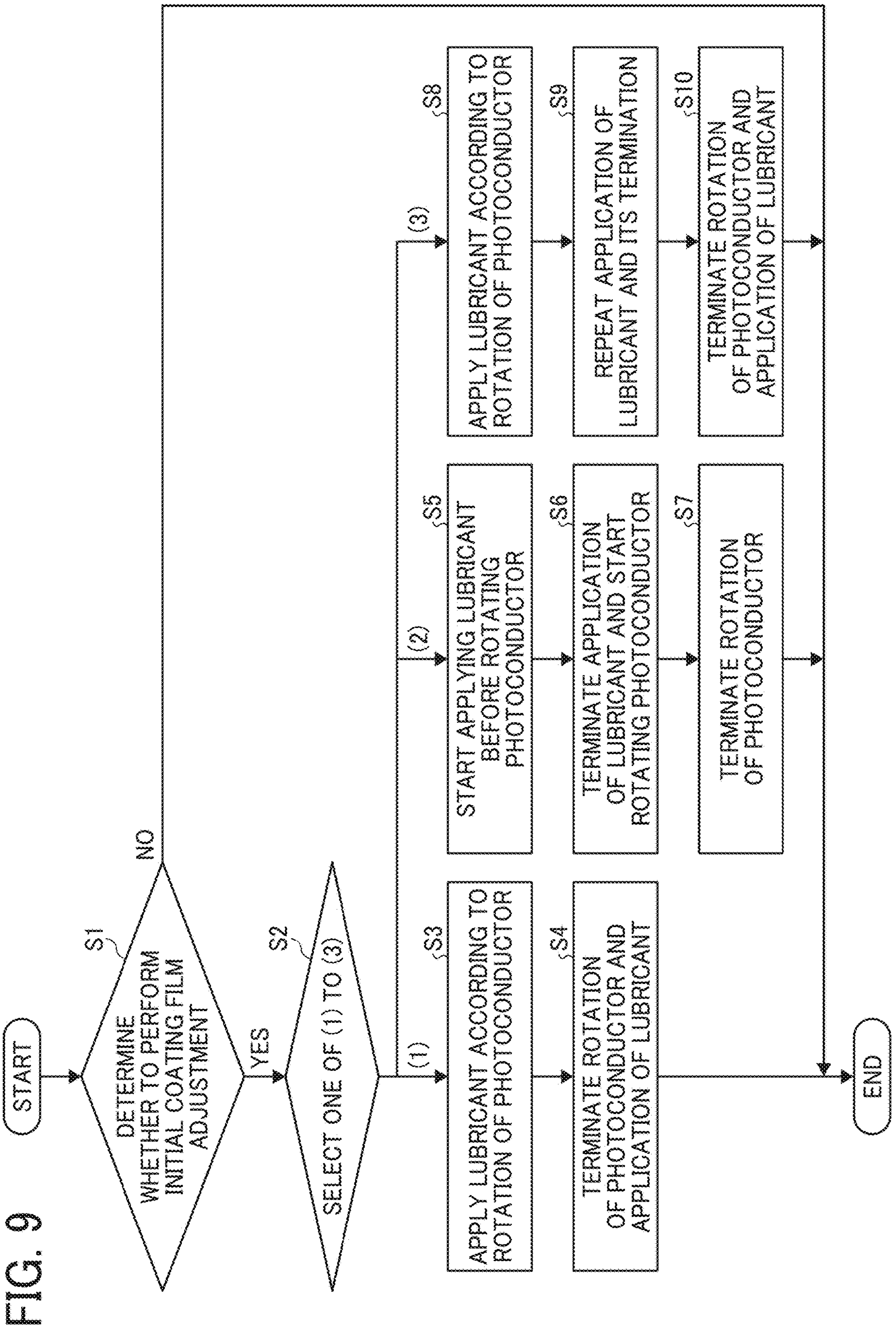
FIG. 9 is a flowchart of the initial coating film adjustment.

FIG. 9 is a flowchart of the initial coating film adjustment.

In step S1, whether to perform the initial coating film adjustment is determined. No limitation is intended as to whether to perform the initial coating film adjustment, but for example, the initial coating film adjustment is performed when the cleaning blade 62 is brand new. Alternatively, the determination may be made according to, for example, the condition of the coating film or the type of apparatus or device. For example, a determination may be made to perform the initial coating film adjustment when a part of coating film 100 is scraped more quickly than the other parts and the coating film 100 cannot be scraped with stability without the application of the lubricant. How the photoconductor 3 and the lubricant applicator 10 are to be controlled according to, for example, the condition for each model or the condition of the coating film may be set or defined in a memory or the like.

In the present embodiment, in step S2, one of (1) to (3) as described above with reference to FIG. 6 is selected when the initial coating film adjustment is to be performed. However, no limitation is indicated by (1) to (3) as described above with reference to FIG. 6. For example, when (1) is performed, as described above with reference to FIG. 6, in step S3, the lubricant is applied according to the rotation of the photoconductor 3. In step S4, the rotation of photoconductor 3 and the application of the lubricant are terminated after the photoconductor 3 is driven to rotate and the lubricant is applied for a certain length of time. By so doing, the initial coating film adjustment can be performed as in (1) as described above with reference to FIG. 6.

When (2) as described above with reference to FIG. 6 is performed, in step S5, the application of the lubricant is started before rotating the photoconductor 3. When the lubricant is applied before driving the photoconductor 3 to rotate, for example, the lubricant application rotor 101 is driven to rotate. After the lubricant is applied for a predetermined length of time, in step S6, the application of the lubricant is terminated, and the photoconductor 3 is driven to rotate. In step S7, after the photoconductor 3 is driven to rotate for a predetermined length of time, the rotation of the photoconductor 3 is terminated. By so doing, the initial coating film adjustment can be performed as in (2) described above with reference to FIG. 6.

When (3) is performed, as described above with reference to FIG. 6, in step S8, the lubricant is applied according to the rotation of the photoconductor 3. In step S9, the application of the lubricant and its termination (ON and OFF) are repeated a predetermined number of times. The length of time for which the application of a lubricant is performed or the length of time for which the application of a lubricant is turned on may be selected or determined as desired. Subsequently, in step S10, the rotation of the photoconductor 3 and the application of a lubricant are terminated. The rotation of the photoconductor 3 and the application of a lubricant may be terminated at different times rather than at the same time. By so doing, the initial coating film adjustment can be performed as in (3) described above with reference to FIG. 6.

As described above, the initial image is formed after the initial coating film adjustment is performed. In the present embodiment described above with reference to FIG. 9, the photoconductor 3 rotates in the normal direction when an image is being formed. When the rotation of the photoconductor 3 is turned on (ON) as in FIG. 6, the photoconductor 3 may be driven to rotate in the reversed manner instead of the rotation in the normal direction, or the rotation in the normal direction and the rotation in the reverse direction may be performed in a mixed manner.

By way of example, aspects of the present disclosure are given below.

First Aspect

An image forming apparatus includes an image bearer, a cleaning blade having an elastic member contacting a surface of the image bearer, the cleaning blade removing a residue on the surface of the image bearer, and a controller. The cleaning blade has a coating film of a lubricant formed on an edge contacting, at least, the image bearer, and the controller performs an initial coating film adjustment before an image is initially formed. The initial coating film adjustment includes driving the image bearer to rotate, sliding the image bearer and the cleaning blade, removing a portion of the coating film of the lubricant, which is formed on the cleaning blade, and exposing the edge of the cleaning blade.

Second Aspect

In the image forming apparatus according to the first aspect, in the initial coating film adjustment, the controller drives the image bearer to rotate in a direction reverse to when an image is formed.

Third Aspect

In the initial coating film adjustment in the image forming apparatus according to the first or second aspect, the controller drives the image bearer to rotate for a length of time equal to or longer than thirty seconds and equal to or shorter than ten minutes.

Fourth Aspect

The image forming apparatus according to any one of the first to third aspects further includes a lubricant applicator to apply a lubricant to the image bearer, and in the initial coating film adjustment, the controller controls whether or not to apply the lubricant using the lubricant applicator.

Fifth Aspect

In the initial coating film adjustment in the image forming apparatus according to the fourth aspect, the controller is to (1) start applying a lubricant using the lubricant applicator as the image bearer starts rotating, and apply the lubricant while the image bearer is being driven to rotate, (2) start applying the lubricant using the lubricant applicator before driving the image bearer to rotate, or (3) apply the lubricant using the lubricant applicator only for a part of a period of time for which the image bearer is driven to rotate.

Sixth Aspect

A method of adjusting a coating film on a cleaning blade in an image forming apparatus includes initially adjusting the coating film before an image is initially formed, and forming a coating film of a lubricant at an edge of the cleaning blade before the initially adjusting the coating film. The edge of the cleaning blade contacts, at least, an image bearer of the image forming apparatus, and the cleaning blade has an elastic member contacting a surface of the image bearer. The cleaning blade removes a residue on the surface of the image bearer. The step of initially adjusting the coating film includes driving the image bearer to rotate, sliding the image bearer and the cleaning blade, removing a portion of the coating film of the lubricant, which is formed on the cleaning blade, and exposing the edge of the cleaning blade.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field-programmable gate array (FPGA), and conventional circuit components arranged to perform the recited functions.

What is claimed is:

1. An image forming apparatus comprising:

an image bearer;

a cleaning blade having an elastic member contacting a surface of the image bearer, the cleaning blade configured to remove a residue on the surface of the image bearer; and a controller, wherein the cleaning blade has a coating film of a lubricant on an edge contacting, at least, the image bearer, and the controller is configured to perform an initial coating film adjustment before an image is initially formed, wherein the initial coating film adjustment includes, driving the image bearer to rotate, sliding the image bearer and the cleaning blade, removing a portion of the coating film of the lubricant on the cleaning blade, and exposing the edge of the cleaning blade.

2. The image forming apparatus according to claim 1, wherein, in the initial coating film adjustment, the controller is configured to drive the image bearer to rotate in a direction reverse to when the image is formed.

3. The image forming apparatus according to claim 1, wherein, in the initial coating film adjustment, the controller is configured to drive the image bearer to rotate for a length of time equal to or longer than thirty seconds and equal to or shorter than ten minutes.

4. The image forming apparatus according to claim 1, further comprising:

a lubricant applicator configured to apply the lubricant to the image bearer, wherein, in the initial coating film adjustment, the controller is configured to control whether or not to apply the lubricant using the lubricant applicator.

5. The image forming apparatus according to claim 4, wherein, in the initial coating film adjustment, the controller is configured to, start applying the lubricant using the lubricant applicator as the image bearer starts rotating, and apply the lubricant while the image bearer is being driven to rotate, start applying the lubricant using the lubricant applicator before driving the image bearer to rotate, or apply the lubricant using the lubricant applicator only for a part of a period of time for which the image bearer is driven to rotate.

6. A method of adjusting a coating film, the method comprising:

initially adjusting the coating film before an image is initially formed; and forming the coating film of a lubricant at an edge of a cleaning blade of an image forming apparatus before the initially adjusting the coating film, wherein the edge of the cleaning blade contacts, at least, an image bearer of the image forming apparatus, the cleaning blade has an elastic member contacting a surface of the image bearer, the cleaning blade is configured to remove a residue on the surface of the image bearer, and the initially adjusting the coating film includes driving the image bearer to rotate, sliding the image bearer and the cleaning blade, removing a portion of the coating film of the lubricant formed on the cleaning blade, and exposing the edge of the cleaning blade.

* * * * *